United States Patent [19]
Levins

[11] Patent Number: 5,820,383
[45] Date of Patent: Oct. 13, 1998

[54] MAGNETIC MANIPULATIVES BOOK

[75] Inventor: Michael Levins, Westport, Conn.

[73] Assignee: Innovative USA, Inc.

[21] Appl. No.: 846,425

[22] Filed: Apr. 30, 1997

[51] Int. Cl.$^6$ .............. G09B 19/00; G09B 3/00; B42D 1/00

[52] U.S. Cl. .............. 434/238; 434/128; 434/168; 434/190; 434/330; 434/333; 434/406; 434/428; 434/429; 273/157 R; 273/239; 281/15.1

[58] Field of Search .................. 434/238, 128, 434/134, 168, 190, 330, 333, 406, 428, 429; 273/239, 283, 285, 153 R, 155, 156, 157 R, 157 A, 153 S, 153 J; 281/15.1, 31, 38, 51; D19/26, 27, 32, 33

[56] References Cited

U.S. PATENT DOCUMENTS

| | | | |
|---|---|---|---|
| 3,496,653 | 2/1970 | Wolfner et al. | 434/168 |
| 4,702,700 | 10/1987 | Taylor | 434/168 |
| 4,832,605 | 5/1989 | Bragin | 434/168 |
| 4,846,689 | 7/1989 | Day | 434/168 |
| 5,029,902 | 7/1991 | Komori | 283/56 |
| 5,636,872 | 6/1997 | Gamer et al. | 283/49 |

Primary Examiner—Robert A. Hafer
Assistant Examiner—John Edmund Rovnak
Attorney, Agent, or Firm—Hedman, Gibson & Costigan, P.C.

[57] ABSTRACT

A book having at least one fold out page with a metal insert which assists the placement or arrangement of magnetic manipulatives onto a page of the book.

15 Claims, 5 Drawing Sheets

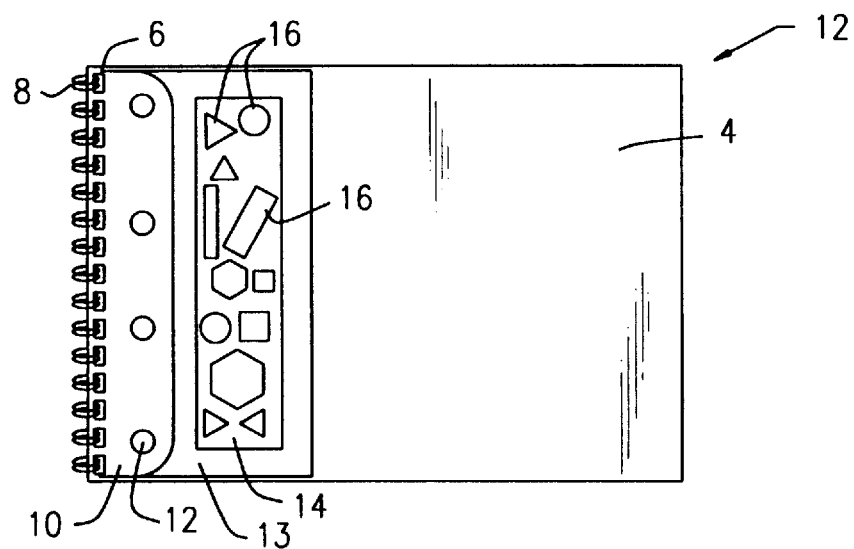
FIG. 1
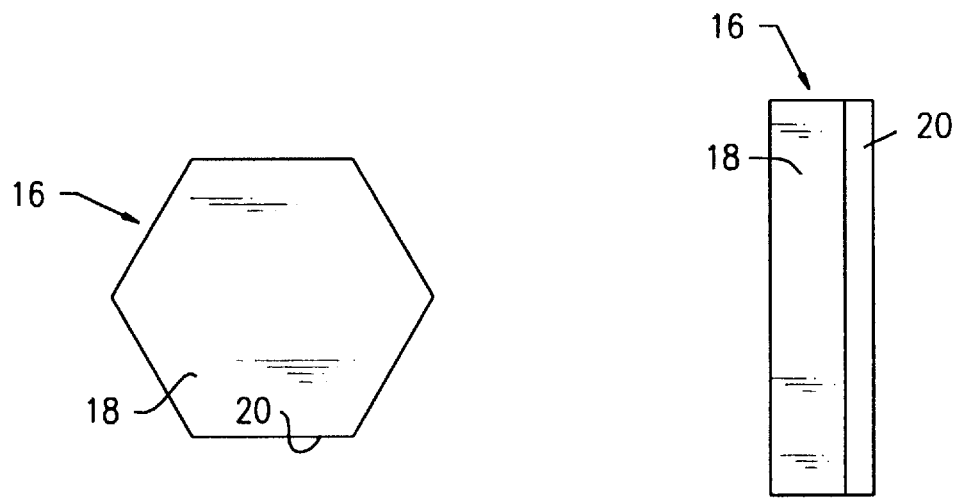
FIG. 1A
FIG. 1B

MAGNETIC MANIPULATIVES BOOK

The present invention relates to a book which is useful with manipulative pieces. More particularly, the present invention is related to a book which is useful with magnetic manipulative pieces. Most particularly, the present invention is related to a book having at least one fold out page with a metal insert which assists the placement or arrangement of magnetic manipulatives onto a page of the book.

BACKGROUND OF THE INVENTION

A variety of books are currently on the market which are provided with manipulative pieces for use with the book. These types of books especially have a high degree of educational value for children. For instance, a certain variety of books has manipulative pieces which may be placed on the page to complete a picture. In other books, a number of manipulative pieces need to be placed adjacent to each other in order to complete a picture. In some instances, the pieces are made in a jigsaw function. See, e.g., United States Patent No. Gunter, U.S. Pat. No. 5,387,107. However, these jigsaw embodiments suffer from the inability to employ typical geometric figures with smooth lines.

In most instances where smooth lined geometric manipulatives are employed, such as but not limited to squares, diamonds, circles, ellipses, rectangles, triangles, pentagons, hexagons, other polygons and irregularly shaped figures, the pieces have a tendency to slide around the page. This creates a difficulty for the user to accurately place the manipulative pieces in the correct order. This difficulty is especially exacerbated when a sturdy flat surfaces is not readily available, such as is not present in a car. Accordingly, there exists in the art a long felt need to provide a means for keeping the manipulatives in place.

SUMMARY OF THE PRESENT INVENTION

It is an object of the present invention to provide a book which can be employed with manipulative pieces.

It is another object of the present invention to provide a book which can be employed with manipulative pieces which are straight line geometric figures.

It is a further object of the present invention to provide a book which employs manipulatives in a manner such that they cooperate to form a picture.

It is still another object of the present to provide a book which has a means for keeping the manipulative pieces from sliding around on a page of the book.

Accordingly, these objects and others are achieved by the book of the present invention which comprises a front cover; a back cover; at least one page between the front and back covers; wherein the front cover, back cover and at least one page are bound together; at least one manipulative piece having a magnet thereon; wherein at least one of the front cover, the back cover and the page are provided with a fold out comprising a sheet of metal or other material attractable to a magnet.

In preferred embodiments the manipulatives are smooth lined geometric figures and are suitable for use with the theme of the book. It is also contemplated herein that the magnetic manipulatives can comprise game pieces which are useful with games which are displayed on the pages of the book. It is further preferred that the back cover of the book be provided with the fold out containing the metal sheet.

Also contemplated within the scope of the present invention is the provision of a means for holding the magnetic manipulatives which means can be attached to the book in any fashion, such as to the book binding.

BRIEF DESCRIPTION OF THE DRAWINGS

FIG. 1 depicts a top view of an embodiment of the present invention.

FIG. 1A depicts a top view of a manipulative object useful in the practice of the present invention.

FIG. 1B depicts a side view of a manipulative object useful in the practice of the present invention.

Figure 2:
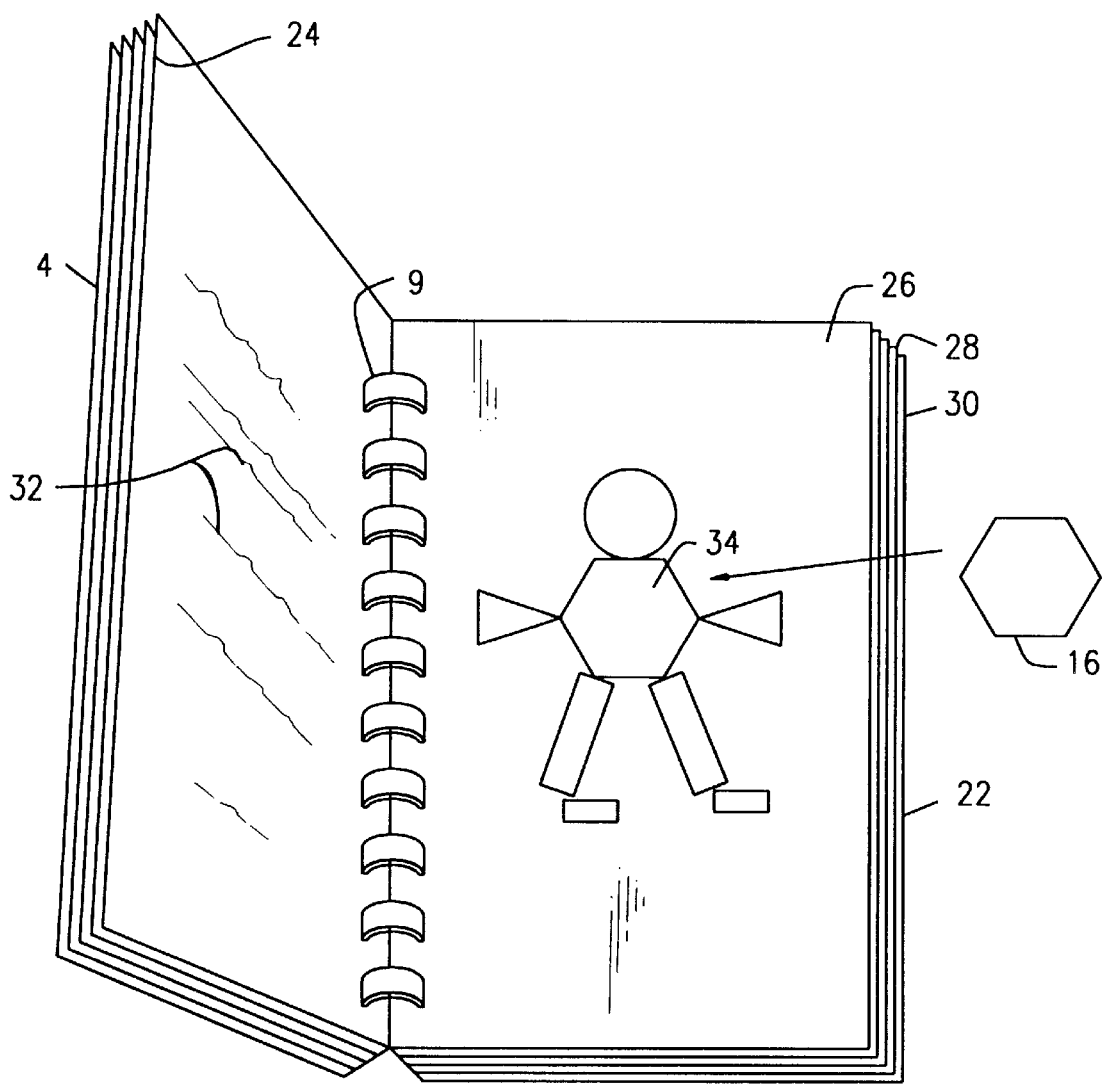
FIG. 2 depicts a book of the present invention in an open position.

DETAILED DESCRIPTION OF THE PRESENT INVENTION AND DESCRIPTION OF THE PREFERRED EMBODIMENTS

The following description of preferred embodiments is presented to illustrate the present invention and is not to be construed to limit the scope of the appended claims in any manner whatsoever.

Referring to FIG. 1, there is shown a top view of a book of the present invention. The book 2 has a front cover 4 and is bound to the other pages with a spiral binding 8 through cut outs 6. The front cover 4 may be constructed of any material known to those skilled in the art which provides sufficient rigidity and printability. These materials may include but are not limited to paper, cardboard, textiles and plastics. Preferred is cardboard ranging from about 1/32 to about 3/32 of an inch thick. Especially preferred is cardboard which is about 1/16 of an inch thick.

The binding of the book may be effected by any of the well known conventional means, i.e. by binding, gluing or with a spiral wire or other material wound through a multitude of holes punched through the pages. The embodiment of FIG. 1 shows the use of a spiral bound book.

Attached to the spiral binding 8 is a connector piece 10 which serves to connect a member 13 containing a pouch 14 which is adapted to hold the manipulatives 16. The member 13 is connected to the connector piece 10 in FIG. 1 by means of tabs 12, although any other means may be used in connection with the present invention. In this manner, the entire member 13 may be removed from the book 4 by unhooking the tabs 12 and then the pouch 14 may be opened to remove the manipulatives 16 for use with the book.

It is noted that the manner of attaching the manipulatives to the book, or even the use of any attachment at all, is not critical to the present invention and any means of packaging may be employed without departing from the spirit of the claimed invention. FIG. 1 merely shows one embodiment, and other packaging embodiments will be readily apparent to those of ordinary skill in the art.

In FIG. 1 the manipulatives are straight edged geometric figures, but as discussed hereinabove, may comprise game pieces or any other manipulative objects. Referring to FIGS. 1A and 1B, a hexagonal manipulative 16 is shown having a top side 18 and a bottom side 20. The top side 18 can be constructed of any relatively light weight material such as foam, foam rubber, plastic, rubber, cardboard, wood and the like. The top side is typically of a thickness which makes the manipulative easy to handle for even small children, such as on the order of one-eighth to one-quarter inch, preferably about three-sixteenths inch.

The bottom side 20 is comprised a magnetized material as is well known to those skilled in the art. The bottom side magnet 20 is fastened to the top side 18 in any manner known to those skilled in the art which is convenient for manufacture. Typically, the bottom side magnet 20 is glued with an adhesive to the top side 18. The magnet can be of any thickness and strength which is sufficient to cause the manipulative to be magnetized to the sheet of metal as used in accordance with the present invention.

Referring to FIG. 2, an opened book 2 can be seen having a front cover 4, a back cover 22 and a plurality of pages 24, 26, 28 and 30. Opposing pages 24 and 26 show that text 32 may be located on the left hand page 24 which relates to a drawing 34 on the right hand page 26. Other pages 28 and 30 may be similarly arranged. The drawing 34 is composed of an outline into which the geometric FIGS. 16 may be arranged to complete the picture. The drawing may be composed of any type of geometric figures and the complexity with which the manipulatives 16 fit onto the drawing 34 can vary from relatively simple to very difficult. The drawing in FIG. 2 is a relatively simple human figure drawing. The book may comprise a series of animals or other related drawings on the individual pages.

It is further contemplated that the pages may comprise other embodiments in which manipulatives are employed, such as a gaming book which includes a variety of game boards such as a checker board, a chess board, or a backgammon board and the like. In these cases the manipulatives 16 would be round discs for checkers and backgammon, and chess men for chess.

The pages are constructed of any paper which is normally employed in books and should be of sufficient thinness to enable the magnet to exert a sufficient force on the metal sheet employed in accordance with the present invention as described more fully hereinbelow.

Figure 3:
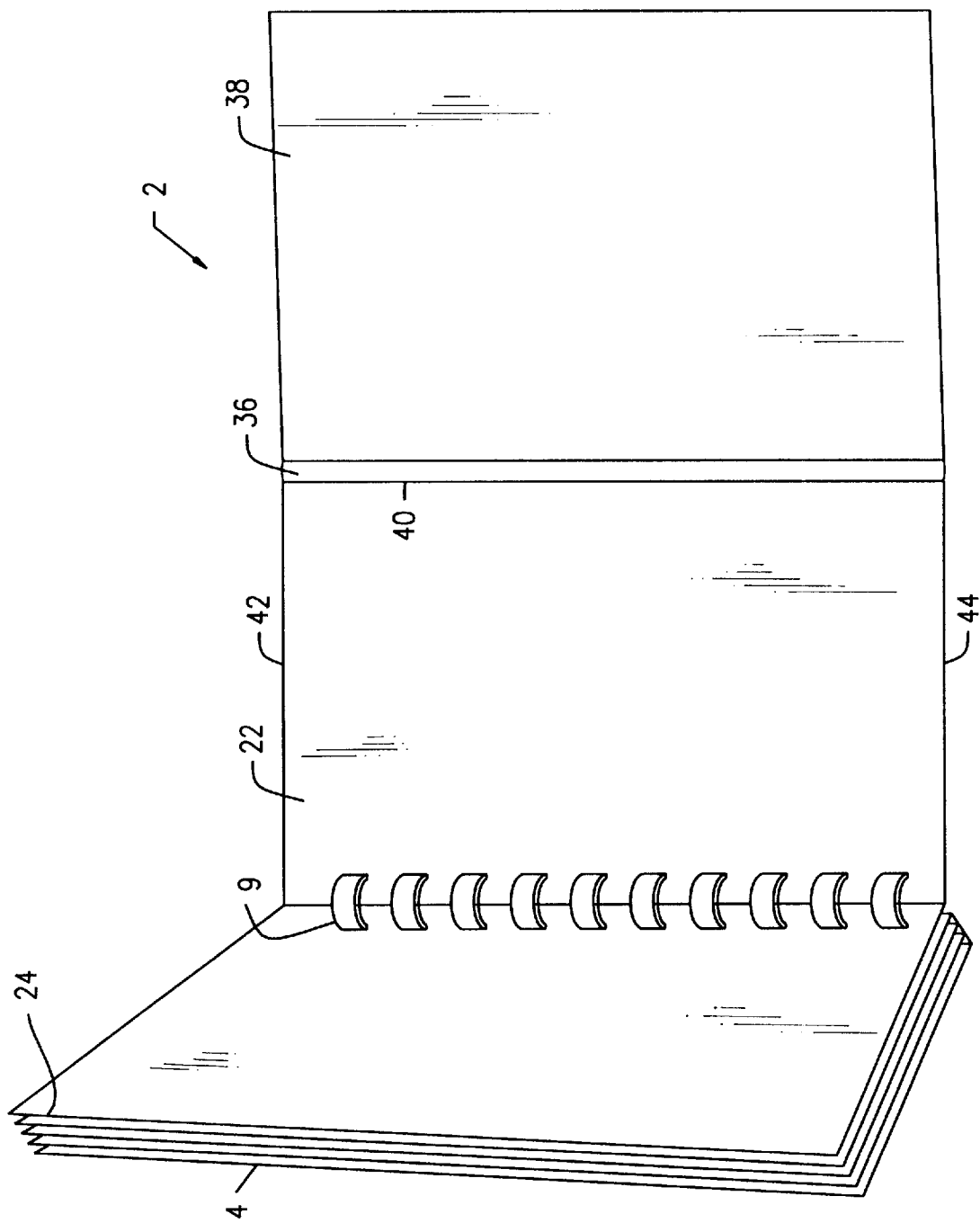
FIG. 3 depicts an embodiment of the inside of the back cover of a book of the present invention.

Referring now to FIG. 3, there is shown a book of the present invention 2 having a front cover 4, at least one page 24 and a back cover 22 which are bound by binding means 9. Attached to the right hand side 40 of back cover 22 is a fold out 38 comprising a sheet of metal. The fold out 38 is attached to the back cover 22 by a gate fold 36 to facilitate folding the fold out 38 as is well known to those of ordinary skill in the art. Other means for assisting folding are also contemplated as within the scope of the appended claims.

Although in one preferred embodiment the fold out 38 is attached at the right hand side 40 of the back cover 22, other embodiments may include attaching the fold out 38 to the top side 42 or bottom side 44 of the back cover 22. Still further, the fold out may be attached to the front cover 4 or a page 24 of the book 2 in a similar fashion.

The fold out 38 is comprised of a sheet of metal which is attracted to the magnets of the manipulatives employed in the practice of the present invention, such as an inexpensive sheet metal. The fold out 38 can be a single sheet of metal, or the metal can be encased in any manner known to those skilled in the art, such as a laminate.

Figure 4:
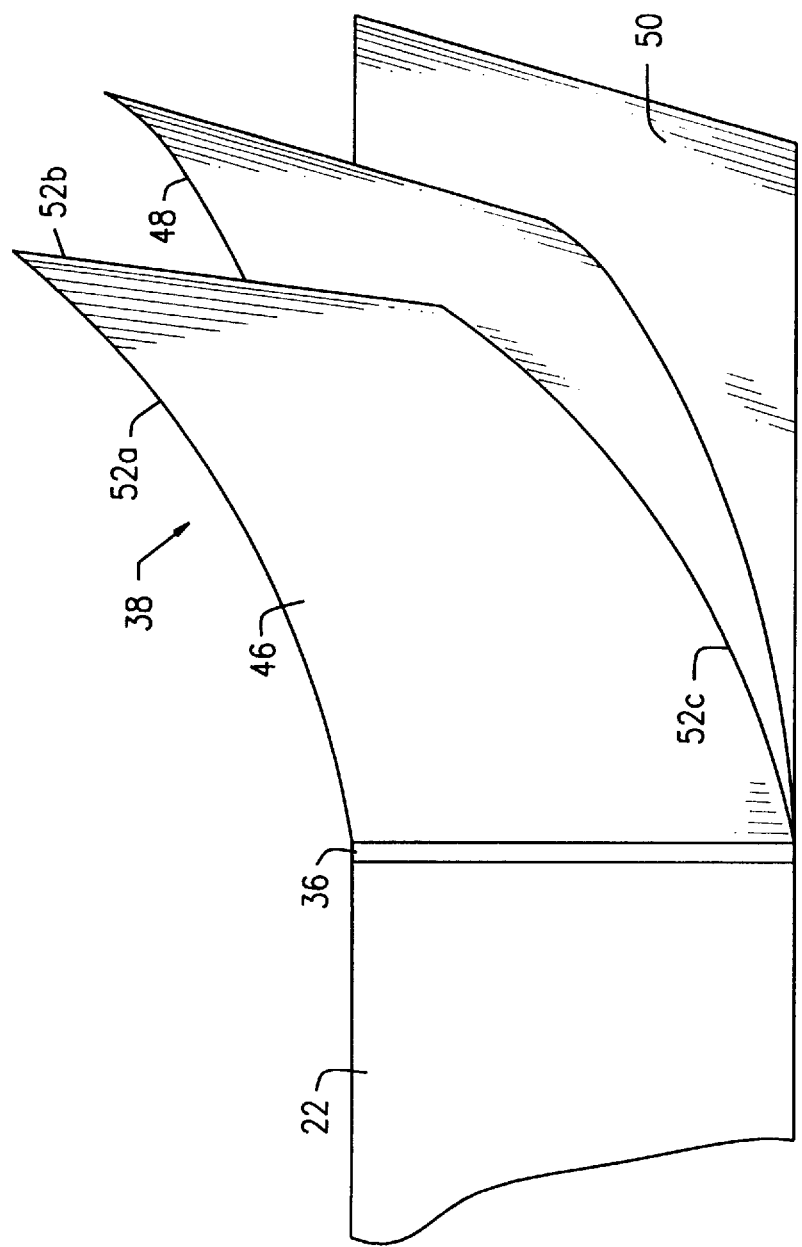
FIG. 4 depicts an exploded view of a fold out member useful in the practice of the present invention.

In one particular preferred embodiment, referring to FIG. 4, the fold out 38 is shown to comprise a non-metal top layer 46, a metal sheet middle layer 48 and a non-metal bottom layer 50. The bottom layer 50 is preferably comprised of a cardboard or other rigid material similar to that use with the front cover. The metal layer 48 is lain on top of the bottom layer 50 and secured in position by gluing the edges 52a, 52b and 52c of top layer 46 to the bottom layer 50.

The top layer is preferably constructed of paper or plastic and is sufficiently thin enough so as not to interfere with the magnetic action between the magnet of the manipulative piece and the metal layer 48.

Figure 5:
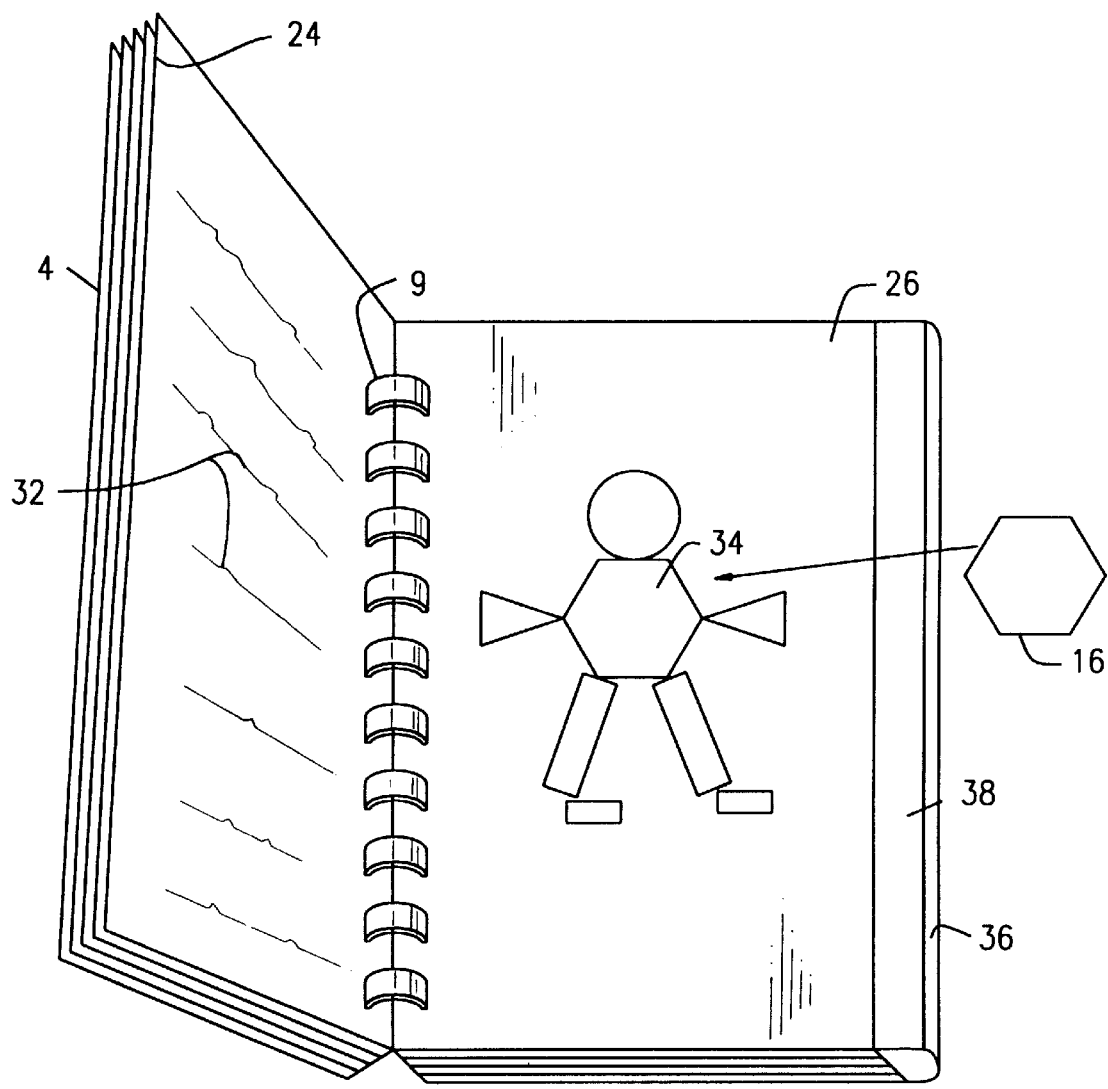
FIG. 5 depicts an embodiment of the present invention with the fold out folded under a page of a book.

In order to operate the book reference is had first to FIG. 3. The book 2 is opened to the back cover and the fold out 38 is extended out in the manner shown in FIG. 3. The pages 24 are then turned downward toward the back cover 22, and the fold out 38 is then folded in under the drawing which is desired to be worked on as shown in FIG. 5. In this manner, the magnet on the bottom of manipulative 16 is of sufficient strength to cause the manipulative 16 to adhere to the appropriate spot on drawing 34 by the magnetic force exerted on the sheet metal contained in fold out 38.

It is noted here that the fold gate 36 is constructed to be of a size suitable to provide sufficient clearance for the fold out 38 to easily fit under any of the pages of the book.

Many variations of the present invention will suggest themselves to those skilled in the art in light of the above-detailed description. For example, instead of the back cover having the fold out attached thereto, the fold out may be attached to the front cover or any other page of the book. Similarly, instead of attaching the fold out to the right side of the back cover, the fold out may be attached to the top or bottom of the back cover, the top or bottom or left side of the front cover or the top or bottom of a book page. Any type of binding known to those of ordinary skill in the art may be used to attach the covers and pages of the book together. All such obvious modifications are within the full intended scope of the appended claims.

It is claimed:

1. A book comprising
   a front cover;
   a back cover;
   at least one page between said front and back covers;
   said front cover, back cover and at least one page being bound together;
   at least one manipulative piece having a magnet thereon for use with said book;
   wherein at least one of said front cover, said back cover and said page are provided with a fold out comprising a sheet of metal or other material attractable to a magnet.

2. A book as defined in claim 1 wherein said fold out is attached to the back cover.

3. A book as defined in claim 1 wherein the fold out is attached to any of said front cover, said back cover or said page by means of a fold gate.

4. A book as defined in claim 2 wherein said fold out is attached to the back cover by means of a fold gate.

5. A book as defined in claim 1 wherein said fold out comprises a bottom non-metal layer, a middle metal layer and a top non-metal layer.

6. A book as defined in claim 4 wherein said fold gate is connected to the back cover on the right hand side of the back cover.

7. A book as defined in claim 4 wherein said fold gate is connected to the back cover on the top side of the back cover.

8. A book as defined in claim 4 wherein said fold gate is connected to the back cover on the bottom side of the back cover.

9. A book as defined in claim 1 wherein said front cover, at least one page and said back cover are bound together by means of a spiral binding.

10. A book as defined in claim 1 further comprising a means for containing said manipulative pieces which is attached to said book.

11. A book as defined in claim 10 wherein said containing means is attached to the binding of said front cover, at least one page and said back cover.

12. A book as defined in claim 1 wherein the pages of the book comprise boards for games and said manipulative pieces are the game pieces for use with said game boards.

13. A book as defined in claim 1 wherein at least one page of the book comprises a checker board and said manipulatives are checkers.

14. A book as defined in claim 1 wherein at least one page of the book comprises a puzzle drawing and the manipulatives are geometric shaped pieces which are the puzzle pieces.

15. A book as defined in claim 1 wherein said manipulative pieces comprise a top side comprised of a material selected from the group consisting of foam, foam rubber, plastic, rubber, cardboard and wood, and a bottom magnet which is adhered to said top side.

* * * * *